US011082127B1

(12) United States Patent
Wynn et al.

(10) Patent No.: US 11,082,127 B1
(45) Date of Patent: Aug. 3, 2021

(54) METHODS AND APPARATUS FOR ACOUSTIC LASER COMMUNICATIONS

(71) Applicant: Massachusetts Institute of Technology, Cambridge, MA (US)

(72) Inventors: Charles Wynn, Groton, MA (US); Yaron Rachlin, Newton, MA (US); Ryan Sullenberger, Somerville, MA (US); Sumanth Kaushik, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/736,212

(22) Filed: Jan. 7, 2020

Related U.S. Application Data

(60) Provisional application No. 62/814,993, filed on Mar. 7, 2019.

(51) Int. Cl.
*H04B 10/11* (2013.01)

(52) U.S. Cl.
CPC .................... *H04B 10/11* (2013.01)

(58) Field of Classification Search
None
See application file for complete search history.

(56) References Cited

U.S. PATENT DOCUMENTS

| 235,496 | A | | 12/1880 | Bell | |
|---|---|---|---|---|---|
| 4,492,862 | A | * | 1/1985 | Grynberg | G01N 21/1702 250/255 |
| 4,641,377 | A | | 2/1987 | Rush et al. | |
| 6,160,255 | A | * | 12/2000 | Sausa | G01H 3/00 250/227.24 |
| 6,236,455 | B1 | * | 5/2001 | Autrey | G01N 21/1702 356/246 |
| 6,608,683 | B1 | * | 8/2003 | Pilgrim | G01N 21/1702 250/339.09 |

(Continued)

OTHER PUBLICATIONS

American National Standard for Safe Use of Lasers, ANSI Z136.1-2007. Laser Institute of America. (American National Standards Institute, 2007). 22 pages.

(Continued)

*Primary Examiner* — Mina M Shalaby
(74) *Attorney, Agent, or Firm* — Smith Baluch LLP

(57) ABSTRACT

The ability to communicate with a specific subject at a prescribed location who lacks any communications equipment opens up many intriguing possibilities. Communications across noisy rooms, hail and warn applications, and localized communications directed at only the intended recipient are a few possibilities. We disclose and show localized acoustic communications, which we call photoacoustic communications, with a listener at long standoff distances using a modulated laser transmitted toward the receiver's ear. The optically encoded information is converted into acoustic messages via the photoacoustic effect. The photoacoustic conversion of the optical information into an audible signal occurs via the absorption of the light by ambient water vapor in the near area of the receiver's ear followed by airborne acoustic transmission to the ear. The recipient requires no external communications equipment to receive audible messages.

18 Claims, 10 Drawing Sheets

(56) References Cited

U.S. PATENT DOCUMENTS

| | | | | |
|---|---|---|---|---|
| 6,618,148 | B1* | 9/2003 | Pilgrim | G01N 21/1702 250/339.09 |
| 6,662,040 | B1* | 12/2003 | Henrichs | A61K 41/00 424/9.2 |
| 7,505,366 | B1 | 3/2009 | Blackmon et al. | |
| 7,613,074 | B1 | 11/2009 | Blackmon et al. | |
| 7,765,871 | B2* | 8/2010 | Riddle | G01N 21/1702 73/590 |
| 8,434,366 | B2* | 5/2013 | Hung | G01N 21/1702 73/643 |
| 9,157,311 | B2* | 10/2015 | Pelletier | G01N 29/222 |
| 9,234,835 | B2* | 1/2016 | Pelletier | G01N 21/1702 |
| 9,618,446 | B2* | 4/2017 | Speck | G01N 21/1702 |
| 10,429,350 | B2* | 10/2019 | Csutak | G01V 1/44 |
| 2005/0117155 | A1* | 6/2005 | Kosterev | G01N 29/2425 356/432 |
| 2006/0266109 | A1* | 11/2006 | DiFoggio | G01N 21/1702 73/152.55 |

OTHER PUBLICATIONS

Audio Spotlight by Holosonics—Focused Audio Technology, Accessed at https://www.holosonics.com/ on Feb. 6, 2019. 7 pages.

Bahl et al., "RADAR: An in-building RF-based user location and tracking system." Proceedings IEEE INFOCOM 2000. Conference on Computer Communications. Nineteenth Annual Joint Conference of the IEEE Computer and Communications Societies (Cat. No. 00CH37064). vol. 2. IEEE, 2000. 10 pages.

Chirgwin, I can hear the light! Boffins beam audio into ears with freakin' lasers, You can't eavesdrop on these whispers. The Register Jan. 25, 2019. Accessed at https://www.theregister.co.uk/2019/01/25/lasers_transmit_audible_message/. 6 pages.

Conover, Lasers could send messages right to a listener's ear. ScienceNews, Feb. 1, 2019. Accessed at https://www.sciencenews.org/article/lasers-could-send-messages-right-listener-ear. 3 pages.

Dent, 'Whisper' laser tech sends audible messages to specific people. Engadget Jan. 28, 2019. Accessed at https://www.engadget.com/2019/01/28/whisper-laser-tech-sound-to-targeted-people/. 3 pages.

Dormehl, MIT's new laser audio system can deliver secret messages directly to your ears. Digital Trends, Jan. 28, 2019. Accessed at https://www.digitaltrends.com/cool-tech/mit-beam-audible-message-laser/. 12 pages.

Egerev, "In search of a noncontact underwater acoustic source." Acoustical Physics 49.1 (2003): 51-61.

Frey, "Human auditory system response to modulated electromagnetic energy." Journal of Applied Physiology 17.4 (1962): 689-692.

Fuller, "Can companies beam advertisements into my brain?" Aug. 5, 2008. HowStuffWorks.com. Accessed at https://electronics.howstuffworks.com/gadgets/high-tech-gadgets/brain-advertisement.htm. Feb. 6, 2019. 4 pages.

Gallagher, "Non-Lethal Weapon: DOD seeks to use lasers to create shouting will-o-the-wisp," Mar. 22, 2018, Accessed at https://arstechnica.com/techpolicy/2018/03/non-lethal-weapon-dod-seeks-to-use-lasers-to-createshouting-will-o-the-wisp/. 5 pages.

Haupt et al., "Standoff acoustic laser technique to locate buried land mines." Lincoln Laboratory Journal 15.1 (2005): 3-22.

Houser, Mit Used a Laser to Transmit Audio Directly Into a Person's Ear. Futurism Jan. 25, 2019. Accessed at https://futurism.com/the-byte/laser-beam-speech-mit. 4 pages.

Lin et al., "Hearing of microwave pulses by humans and animals: effects, mechanism, and thresholds." Health physics 92.6 (2007): 621-628.

Lister et al., "Optical properties of human skin." Journal of biomedical optics 17.9 (2012): 090901. 16 pages.

LRAD Mass Notification & Life Safety Systems Archives, LRAD, Accessed at https://www.lradx.com/product_categories/lrad_mass_notification_systems/ on Feb. 6, 2019. 3 pages.

Mandelbaum, Scientists Figured Out How to Send Secret Messages to Your Ear With Lasers. Gizmodo Jan. 25, 2019. Accessed at https://gizmodo.com/scientists-figured-out-how-to-send-secret-messages-to-y-1832059135. 4 pages.

Meister, U.S. Military Developing Non-Lethal Noise Gun. Design World Aug. 4, 2015. Accessed at https://web.archive.org/web/20160205014455/https:/www.pddnet.com/news/2015/08/us-military-developing-non-lethal-noise-gun on Apr. 14, 2020. 5 pages.

Pescovitz, Lasers can beam audible messages directly to people's ears. Boingboing, Jan. 24, 2019. Accessed at https://boingboing.net/2019/01/24/lasers-used-to-beam-audible-me.html. 6 pages.

Rothman et al., "The HITRAN2012 molecular spectroscopic database." Journal of Quantitative Spectroscopy and Radiative Transfer 130 (2013): 4-50.

Shannon, "Communication theory of secrecy systems." Bell System Technical Journal 28.4 (1949): 656-715.

Sharpe et al., "Gas-phase databases for quantitative infrared spectroscopy." Applied Spectroscopy 58.12 (2004): 1452-1461.

Sullenberger et al., "Photoacoustic communications: delivering audible signals via absorption of light by atmospheric $H_2O$." Optics Letters 44.3 (2019): 622-625.

Sullenberger et al., "Trace aerosol detection and identification by dynamic photoacoustic spectroscopy." Optics Express 22.107 (2014): A1810-A1817. 8 pages.

Tam, "Applications of photoacoustic sensing techniques." Reviews of Modern Physics 58.2 (1986): 381. 54 pages.

Want et al., "The active badge location system." ACM Transactions on Information Systems 4 (1997): 42-47.

Werb et al., "Designing a positioning system for finding things and people indoors." IEEE Spectrum 35.9 (1998): 71-78.

Wyner, "The wire-tap channel." Bell System Technical Journal 54.8 (1975): 1355-1387.

Wynn et al., "Dynamic photoacoustic spectroscopy for trace gas detection." Applied Physics Letters 101.18 (2012): 184103. 5 pages.

Xu et al., "Photoacoustic imaging in biomedicine." Review of Scientific Instruments 77.4 (2006): 041101. 23 pages.

International Search Report and Written Opinion in International Patent Application No. PCT/US2020/012514 dated Sep. 18, 2020, 13 pages.

Jiang et al., "Research on the optoacoustic communication system for speech transmission by variable laser-pulse repetition rates." Results in Physics 9 (2018): 1291-1296.

* cited by examiner

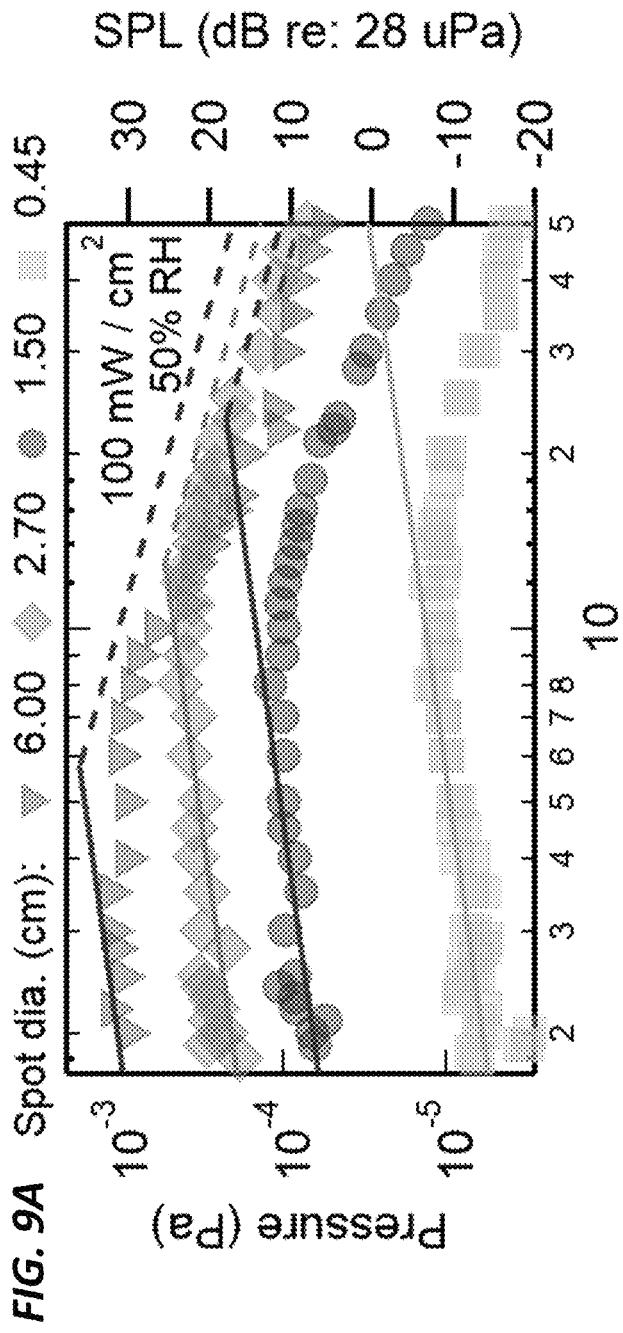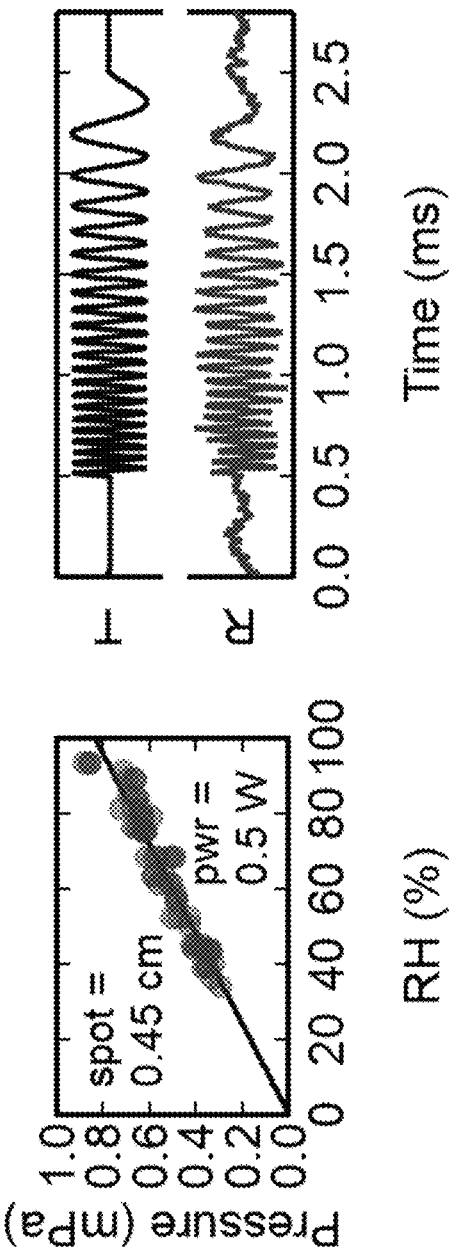
FIG. 9A
FIG. 9B
FIG. 9C

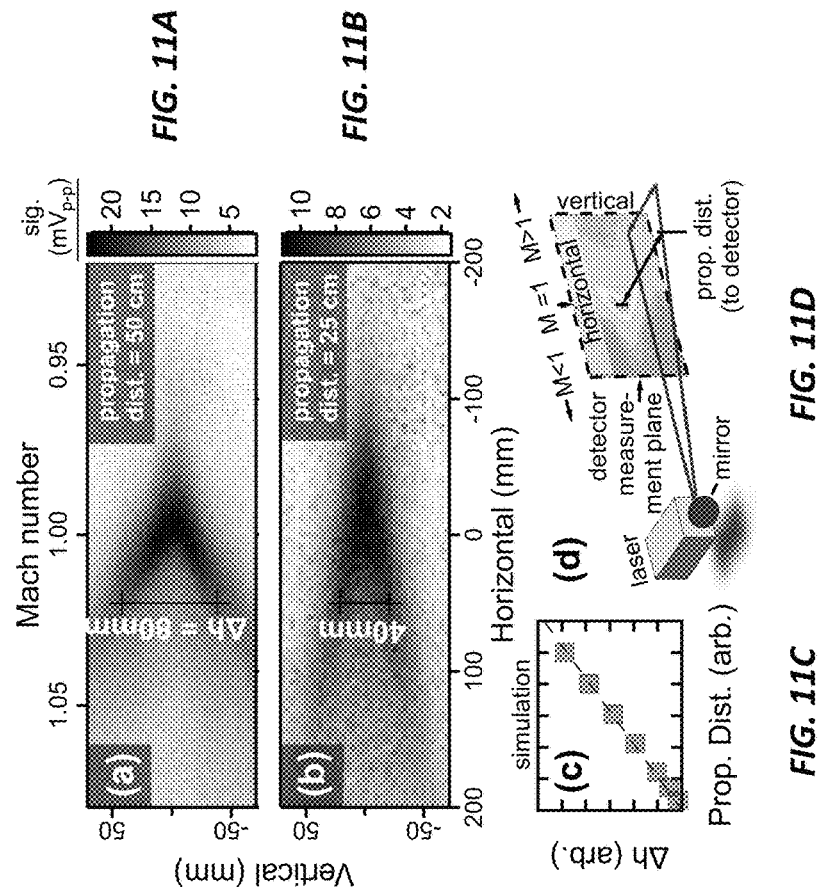

METHODS AND APPARATUS FOR ACOUSTIC LASER COMMUNICATIONS

CROSS-REFERENCE TO RELATED APPLICATION(S)

This application claims the priority benefit, under 35 U.S.C. 119(e), of U.S. Application No. 62/814,993, which was filed on Mar. 7, 2019, and is incorporated herein by reference in its entirety for all purposes.

GOVERNMENT SUPPORT

This invention was made with Government support under Grant No. FA8702-15-D-0001 awarded by the U.S. Air Force. The Government has certain rights in the invention.

BACKGROUND

In 1880, Alexander Graham Bell patented a 'photophone' that used modulated light to create sound. Bell's patent, U.S. Pat. No. 235,496, described how the photophone had a transmitter to modulate a beam of light and a photodetector that received the modulated beam. More recently, Rush et al. disclosed a photoacoustic speaker in U.S. Pat. No. 4,641,377, which modulated laser light was shined into "a gas absorption chamber".

Recently, there has been work investigating photoacoustic communications using air. This technique, known as the "Laser-Induced Plasma Effect" or LIPE, uses a laser to ionize the air, creating a plasma and ultimately a sound near the end receiver. The use of ionizing radiation for producing sound and the need for very high power lasers are safety concerns for the feasibility of this approach.

Limited work has been performed examining the use of microwaves to stimulate sound directly in a user. However, microwave-induced acoustic communications have been limited to barely audible clicks (no complex messages) due to the inefficiencies in the transmission through bone and tissue. Further, none of the microwave-induced acoustic communications demonstrated to date can localize an individual in the manner a laser-based photoacoustic communications system does.

Phased array acoustic systems (e.g., the Audio Spotlight by Holosonics) and non-linear frequency conversion (e.g., Long Range Acoustic Devices by LRAD Corp) have also been used for projecting sound. However, diffraction causes the acoustic spot size produced by a linear acoustic array to be much larger than the acoustic spot size possible with optical conversion. (The typical diffraction angles are on the order of milliradians at acoustic frequencies and on the order of microradians at optical frequencies). Parametric acoustic sources overcome diffraction by transmitting higher frequency ultrasound and taking advantage of nonlinear mixing of two beams. Unfortunately, the lossiness of high-frequency sound limits the range of such a system to about 10 meters.

SUMMARY

We disclose how to transmit an audible audio message to a 'disadvantaged user' with no receiver other than their own ears, while those nearby hear no message. In this communications modality, the sender uses a laser to transmit messages. Transmitted messages are encoded upon a modulated laser beam and sent directly to the receiver's ear via the photoacoustic effect. No external (electronic or optical) receiver is necessary. Since a laser is used to close most of the link distance, the communications distance can be fairly large, e.g., tens of meters or more.

The ability to communicate privately with a subject who lacks any communications equipment opens up many intriguing possibilities. Communications across noisy rooms and surreptitious or covert communications directed at only the intended recipient are a few possibilities.

More generally, photoacoustic communications can be used to provide physical layer security when coupled with a simple receiver. It provides a signal that is localized in three dimensions, unlike other communications protocols, such as traditional laser communication. It offers robustness and immunity to intercept not necessarily available via standard radio communications. Other limited means of transmitting audio exist, but none of them can localize and safely direct information to a single user.

Photoacoustic communications can be implemented by emitting an intensity-modulated laser beam from a laser source and illuminating water vapor with the intensity-modulated laser beam. The intensity-modulated laser beam creates a pressure wave in the water vapor via the photoacoustic effect, and this pressure wave creates an audible sound, e.g., at a person's ear. The intensity-modulated laser beam may be generated from the laser source at a wavelength of 1.9 µm. The intensity of the intensity-modulated laser beam can be modulated, e.g., by an acousto-optic modulator, at a frequency of about 20 Hz to about 20 kHz.

The intensity-modulated laser beam can be swept across an arc with the intensity-modulated laser beam traveling at a linear speed of Mach 1 at a range R from the laser source. The pressure wave's amplitude can be higher at the range R than at other ranges. Changing a rotational velocity of the intensity-modulated laser beam across the arc changes the range R at which the intensity-modulated laser beam travels at the linear speed of Mach 1.

A receiver (e.g., with a microphone) can detect the audible sound. A processor coupled to the microphone can decode a message conveyed by the audible sound. And a transmitter operably coupled to the processor can transmit a response to the message. The receiver's location can be verified based on the response to the message.

The intensity-modulated laser beam can be a first intensity-modulated laser beam and the pressure wave is a first pressure wave, in which case a second intensity-modulated laser beam can illuminate the water vapor while the first intensity-modulated laser beam illuminates the water vapor. The second intensity-modulated laser beam creates a second pressure wave in the water vapor via the photoacoustic effect, and this second pressure wave adds with the first pressure wave to create the audible sound. The first and second pressure waves may add coherently.

Photoacoustic communications can be used to prove a location of a receiver. To do this, a transmitter illuminates water vapor near a receiver with a laser beam modulated with a message. The intensity-modulated laser beam creates a pressure wave modulated with the message in the water vapor via the photoacoustic effect. The receiver detects the pressure wave modulated with the message and decodes the message, then transmits a response to the message. The message may include instructions for establishing a secure communications channel between the transmitter and the receiver. The transmitter may verify a location of the receiver based on the response to the message.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9A shows transfer functions describing the photoacoustic conversion of eye safe optical energy at 50% RH into acoustic energy for various laser spot sizes. Markers represent measured data and lines represent theory [solid=Eq. (2), dashed=Eq. (1)]

FIG. 9B shows measured photoacoustic signal (in mPa) versus RH, where the signal strength is linear with RH.

FIG. 9C shows transmitted (T) and received (R) versions of a photoacoustic communications waveform (here, a 20 kHz to 1 kHz frequency sweep).

FIG. 10A shows a photoacoustic signal heat map (sweep velocity in Mach number versus time) for dynamic photoacoustic communications (sweep length=50 cm, range=2.5 m), for a 5 mm laser spot at the target. Waveforms at Mach (M)=1.05, M=1.00, and M=0.95 are shown to the right of the heat map. Positive and negative values represent compression and rarefaction, respectively.

FIG. 10B shows pressure versus laser spot size for dynamic photoacoustic communications.

FIG. 10C shows compression timescale (duration of the leading compressive wave) of dynamic photoacoustic waveform versus spot size. The compression timescale is indicative of the forcing function on the water vapor molecules from the swept laser beam.

FIGS. 11A and 11B shows measured spatial extent of the acoustic signal (mVp-p) produced via a dynamic photoacoustic system at a range of 2.5 m, sweep length of 25 cm, and total propagation distance from start of sweep to receivers at 50 cm and 25 cm, respectively. A horizontal position of 0 mm corresponds to Mach 1. Horizontal positions greater than 0 mm correspond to sweep speeds greater than Mach 1, and horizontal positions less than 0 mm correspond to sweep speeds less than Mach 1.

FIG. 11C shows a simulation of the separation distance (Δh) measured at supersonic sweep speeds. The simulated separation distance grows linearly with propagation distance, which agrees with the measured data.

FIG. 11D shows a schematic of the spatial measurements made in FIGS. 11A and 11B.

Figure 12:
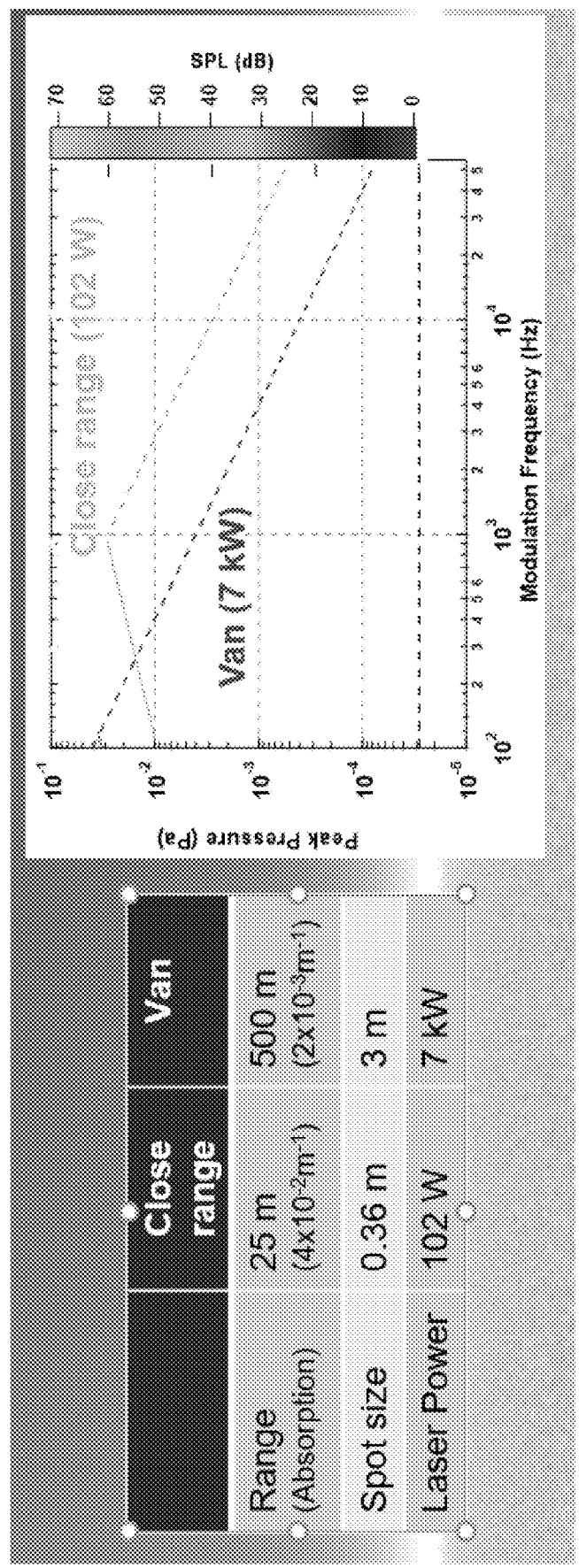

FIG. 12 shows specifications and performance of moderate-range dynamic photoacoustic system.

Figure 13:
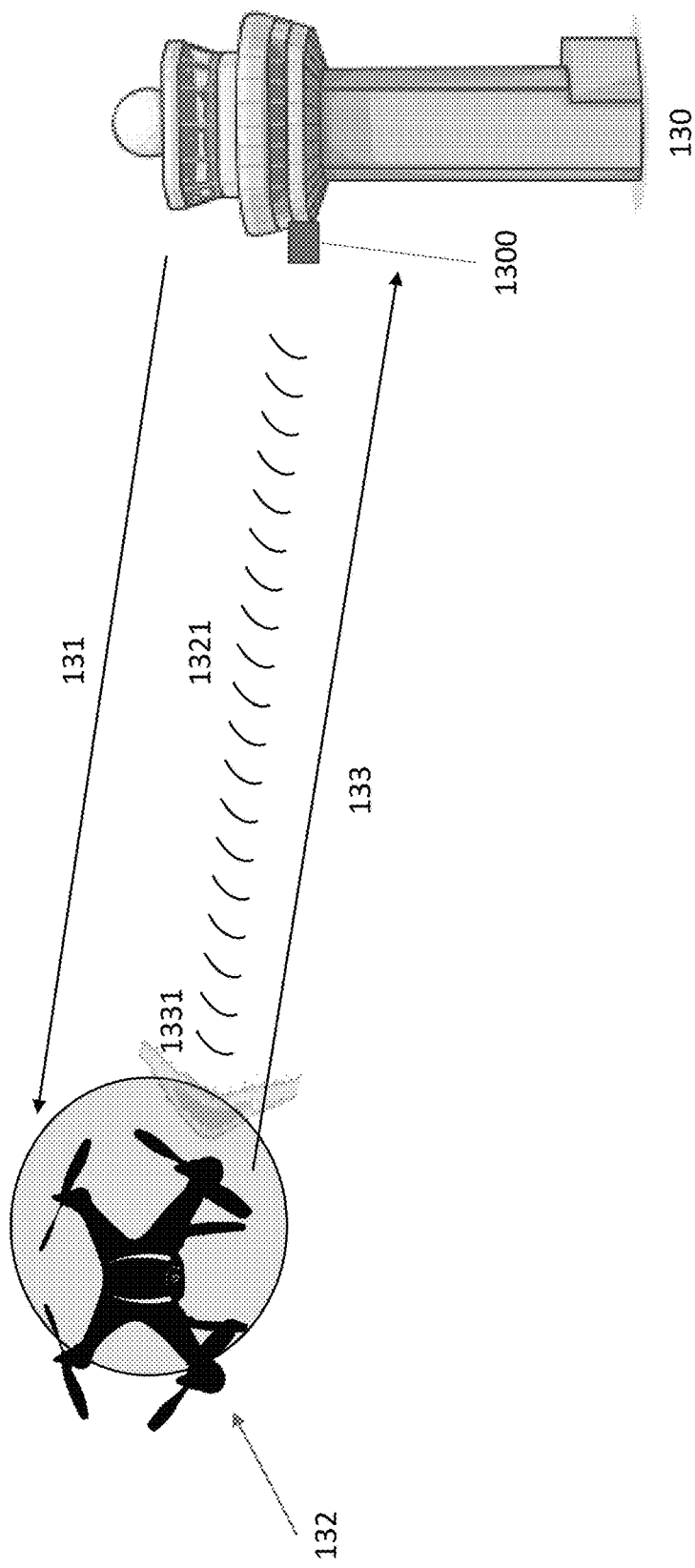

FIG. 13 illustrates location proving using photoacoustic communication.

DETAILED DESCRIPTION

In one implementation of photoacoustic communications, a transmitter communicates with a 'disadvantaged receiver' (a person without any electronic or mechanical detectors) using a modulated laser beam transmitted toward the receiver's ear. The optically encoded information is converted into an acoustic message via the photoacoustic effect. The photoacoustic conversion of the optical information into an audible signal can occur via one of three modalities: (1) absorption of the light by an ambient gas species (e.g., water vapor) in the near area of the receiver's ear; (2) absorption of light by the receiver's skin and subsequent transmission to the inner ear; or (3) photoacoustic coupling to a nearby object of opportunity (e.g., a window or nearby vessels of fluid) followed by airborne acoustic transmission across a relatively short distance to the receiver. For each modality, the disadvantaged receiver hears the audible signal with his or her ear. The generation of the acoustic message occurs with an efficiency that depends upon the laser wavelength, laser intensity, laser modulation frequency, absorptivity of the absorbing medium (e.g., the water vapor), and/or phase of the absorbing medium (solid, liquid, or gas) among other factors.

The sound can be amplified by sweeping the modulated laser beam across an arc such that the linear speed of the modulated laser beam is Mach 1 (the speed of sound) at the radius of the intended receiver. The acoustic waves add coherently along the sweep direction, creating a local sound front similar to a shock wave that propagates in the direction of the laser sweep. The amplification and directionality of this process, called dynamic photoacoustics, increase the local sound levels, localize the signal, and direct the signal toward a preferred receiver. The sound is localized because the signal intensity falls off as $1/R^2$, where R is the distance from the localized region. Dynamic photoacoustics yields spatially localized sound while amplifying faint photoacoustic signals from gases as well as aerosols.

Generally, the gain provided by sweeping the laser beam over an arc is proportional to L/D, where L is the arc length and D is the laser spot diameter. The larger the arc, the higher the gain. For a single laser beam, however, a longer arc length and higher gain usually translate to a lower revisit rate. Practically, the limiting factor is the angle over which the laser beam is swept as opposed to the arc length L. In practice, the returns diminish for angles greater than about 10°. Without being bound by any particular theory, this is likely because for angles less than 10°, the curvature of the arc is small, and the waves add coherently along the arc as if they are in a line.

In principle, photoacoustic communications can be used to send a message to any person without communications equipment. This message could include covert information for a friend or confusing information for a foe. Photoacoustic communications could also be useful in search and rescue operations, e.g., to send rescue instructions to someone without a radio in a burning building or at sea. It could be used for ship-to-ship communications when other communications channels are not available. It could be used in noisy environments, such as in aircraft or crowded rooms, by aiming a modulated laser beam at someone with a small device (e.g., potentially the size of a smartphone) with the decibel level of the photoacoustic signal set high enough to be heard over the noisy background.

The applications of photoacoustic-enabled secure communications are broad and include the secure communications to disadvantaged users (people without electronic receivers) as described above as well as the secure distribution of cryptographic keys and the secure dissemination of information to physically isolated device equipped with microphones. Because the acoustic signal can be delivered to a spatially localized volume, these cryptographic keys could be used to verify that a receiver is at a particular location—a technique called location proving—as well as to establish secure optical or radio-frequency communications links between the transmitter and receiver. The size of this spatially localized volume scales with the range of the spatially localized volume from the laser source. Its size and shaped can be altered (e.g., made smaller) by interfering sound waves generated by different laser beams.

Photoacoustic-enabled location-proving protocols include:
- Enforcing security policies by enabling logging into computer systems only at certain physical locations;
- Augmenting cooperative localization of aircraft in lieu of or in addition to radar (e.g., for air traffic control of autonomous drones);
- Proving route execution without major deviations by autonomous systems (e.g., for autonomous driving for delivery without relying on easily faked GPS signals); and
- Verifying three-dimensional (3D) positions of and specifying 3D way points for autonomous vehicles, including unmanned aerial vehicles and self-driving cars.

In each of these location-proving protocols, a photoacoustic transmitter sends a private acoustic message to a predetermined location (e.g., an authorized location for logging into a computer systems). The message is audible (detectable) only within a small radius of the predetermined location, so it doesn't have to be encrypted or encoded. Instead, it can be transmitted privately but in the clear. A person or device at that location senses the private acoustic message and uses it to verify that they are at the predetermined location. For instance, the private acoustic message could include a password for logging into a computer system, a code or private key for establishing a communications link via a non-acoustic channel, or a code for proving that the person or device was at a particular location at a particular time.

Photoacoustic Communications

Figure 1:
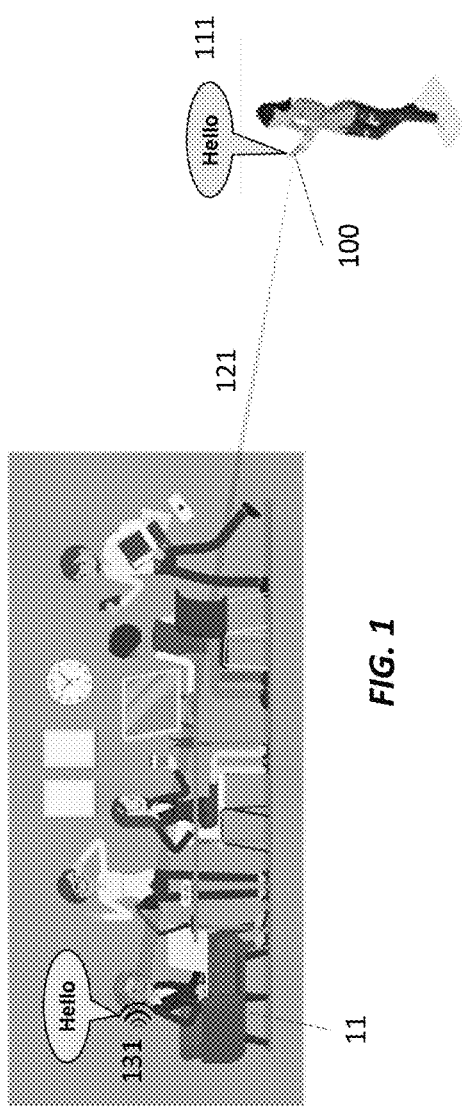
FIG. 1 shows photoacoustic communications with a disadvantaged user. A signal is directed across a noisy room to the user, who hears the signal with her ears without an external (electronic or optical) receiver.

FIG. 1 illustrates communicating with a disadvantaged user 11 via photoacoustics. A photoacoustic transmitter 100 transmits a laser beam 121 modulated with information 111 across a noisy room to the user 11 alone, who uses her ears to receive the information 111 encoded in the modulated laser beam 121. The user 11 perceives this information 111 as audio messages 131 produced via photoacoustic modulation. The modulated laser beam 121 propagates through the atmosphere with limited absorption, thus closing much of the physical range gap between the transmitter 100 and the disadvantaged user 11 with limited losses. Water vapor or other ambient gas in the near vicinity of the disadvantaged user 11 absorbs the modulated laser beam 121. This absorption results in an acoustic signal 131 that is audible to the recipient 11.

If the photoacoustic modulation of the water vapor is highly localized, then only the user 11 can hear the audio messages 131: the signal is too weak outside the modulation zone to be heard by other people in the room. This decay in signal amplitude may be due to the attenuation of high-frequency signals in air, high gain generated by sweeping the modulated laser beam 121 in an arc toward the user's ear, or both. In any case, the differential channel capacity created by photoacoustic communications enables information theoretically secure communications between the user 11 and the photoacoustic transmitter 100 at a rate that is that is a function of the difference in channel capacities. This information theoretically secure communications channel can be used to distribute secret information, such as private keys or computer passwords, or more innocuous information, such as translations of conversations or audio content played in the room.

Figure 2:
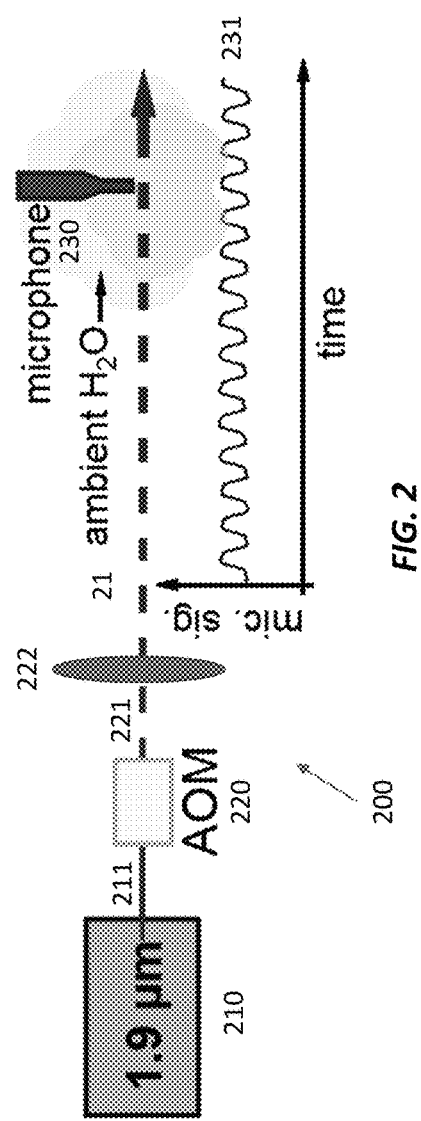
FIG. 2 illustrates delivery of audible messages via photoacoustics through absorption of amplitude-modulated, 1907.2 nm laser light by ambient water vapor.

FIG. 2 shows a first system 200 for efficiently producing localized continuous-wave and pulsed sound at amplitudes of more than 0 dBA and distances greater than 2.5 m using photoacoustics in air. The system 200 includes a thulium laser 210, an acousto-optic modulator (AOM) 220, and an optional (variable-focus) lens 222 (e.g., a zoom lens). Other suitable types of modulation include direct modulation of the laser, electro-optic amplitude modulation, and mechanical choppers in the path of the laser beam. The AOM 220 can steer the laser beam as well as modulating the laser beam's amplitude, which is useful for the dynamic photoacoustic communication case discussed below.

In operation, the AOM 220 modulates the amplitude of a laser beam 211 at a wavelength of 1.9 µm emitted by the thulium laser 210. The lens 230 focuses this modulated laser beam 221 to a point located near the intended receiver, which may be a person or a device with a microphone 230, as shown in FIG. 2. Changing the focus of the variable-focus lens 222 translates this point toward or away from the system 200. The modulated laser beam 221 produces continuous wave (CW) audible signals 231 near the receiver via the absorption of the light by ambient water vapor 21 at or near the focal point.

The laser parameters may be constrained by human safety levels (e.g., eye-safe irradiance levels for light at a wavelength of about 1.9 µm). The laser wavelength and power level should be chosen to enable efficient long-range communication as well as to satisfy requirements for laser eye-safety. Given the eye and skin safe requirements, the 'thermal damage' regime of about 1.4 μm to thousands of microns is preferable. The wavelength could even be in the microwave or millimeter-wave region of the electromagnetic spectrum.

Since acoustic pressure is directly proportional to optical absorption, a laser wavelength for which water is strongly absorbing is advantageous. Even in very dry environments, there exist appreciable amounts of water in the air. The upper bound for airborne water vapor is 100% relative humidity (RH). At standard temperatures (25° C.), this corresponds to $4.4 \times 10^4$ ppm water molecules in the air. Water has several particularly strongly absorbing features in the near infrared. Because the near infrared is strongly absorbed by water, it poses significantly less safety risk than wavelengths that can penetrate through the eye to the retina. The primary safety risk at these wavelengths is thermal damage with eye and skin safety threshold of 100 mW/cm². Many commercial high-power (typically fiber) lasers exist in this regime including lasers that emit light at wavelengths of 1.4 μm, 1.5 μm, or 1.9 μm. Strong absorption by water, low eye-safety risk, and the availability of high-power lasers make the near-infrared region of the electromagnetic spectrum very attractive for efficient operation.

A functional photoacoustic communications system should produce audible sound at a safe laser power (e.g., up to about 100 mW/cm²). The AOM 220 modulates the laser beam 211 at frequencies in a range of about 20 Hz to about 20 kHz, i.e., the audible frequency range for humans. The modulation band can be shifted to ultrasonic or infrasonic frequencies if the receiver is not a human—for example, if the receiver is an animal or microphone. And the lens 222 focuses the modulated laser beam 221 to a spot size that depends on the range to the target. At ranges of tens of meters, spot sizes of centimeters are reasonable. At longer ranges (e.g., >100 m), the spot sizes may be tens of centimeters. If desired, a large focusing optic could be used near the AOM 220 to shrink the spot sizes to millimeters.

Dynamic Photoacoustic Communications

Figure 4:
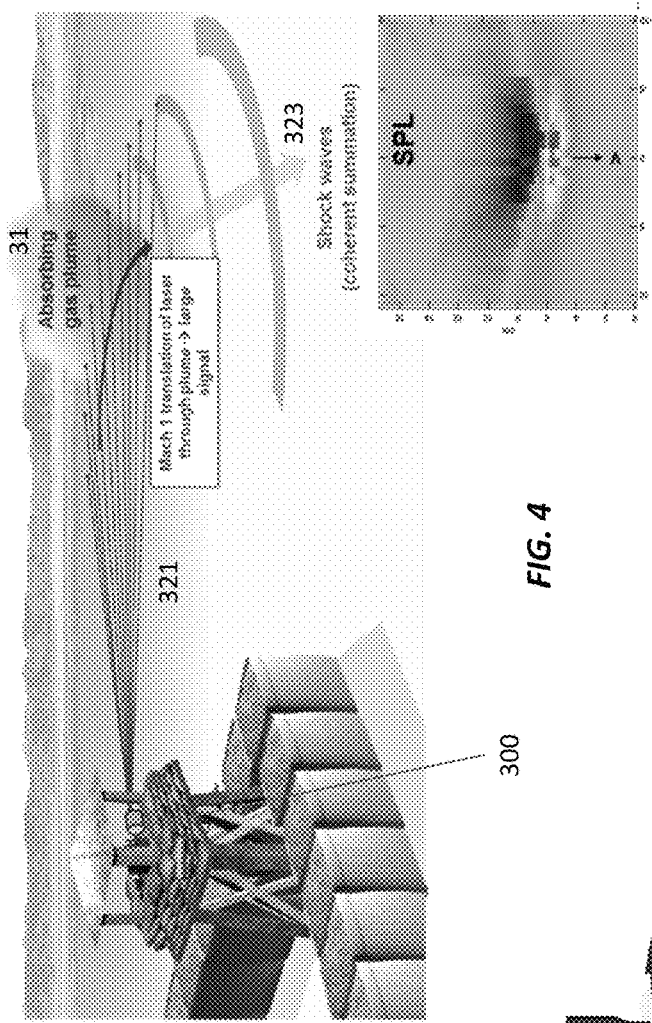
FIG. 4 is a diagram of a dynamic photoacoustic system deployed on a watchtower.
Figure 3:
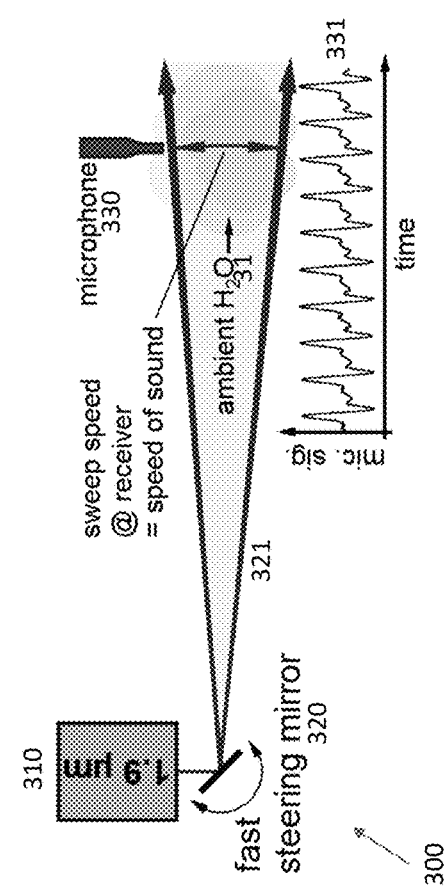
FIG. 3 illustrates dynamic photoacoustic communications in which a laser beam is swept at the speed of sound using a scanning mirror or other beam scanner. The resultant photoacoustic sound is amplified along the direction of the sweep.

FIGS. 3 and 4 show a dynamic photoacoustics system 300 that amplifies faint photoacoustic signals. The dynamic photoacoustic system 300 includes a thulium laser source 310 that emits a laser beam that is pulsed or amplitude-modulated with an acoustic signal. A fast-steering mirror 320 or other beam-steering element, such as an acousto-optic deflector (AOD), sweeps the modulated laser beam 321 such that the laser spot travels at the speed of sound (Mach 1) over an arc (<<360°) adjacent to the receiver, generating acoustic waves 323 that propagate in the direction of the laser sweep as shown in FIG. 4. The arc length may be about 1-10°, depending on desired gain and sweep repetition frequency, where longer arc lengths generally lead to smaller duty cycles. The acoustic waves 323 add coherently along the sweep direction creating a local sound front similar to a shock wave that propagates in the direction of the laser sweep. This is similar to dynamic photoacoustic spectroscopy, which has been used successfully for standoff detection of trace chemicals.

The swept beam technique provides a coherent gain (proportional to L/D as explained below) only at a very specific range, i.e., the range at which the beams are moving at Mach 1, to produce audible signals 331. This range can be anywhere from 1 m to 10 km. At other ranges, the signal is significantly weaker and may be too weak to be detected. This variation in signal strength with range is because the majority of the energy propagates in the sweep direction. Moving away from the near field of the laser source, the signal intensity decays with $1/R^2$ scaling.

This variation in the gain can be used to create a secure communications channel to a receiver (e.g., a person's ear or a microphone 330 as in FIG. 3) in a specific region in space with a localized signal that is stronger than elsewhere (e.g., above a detection threshold). Generally, the size and shape of the region with localized signal is set by the interference of the waves produced by the laser beam at different times and locations.

The location and direction (range and angle) of the coherent addition can be changed by adjusting the sweep rate of the modulated laser beam to move the radial location of the arc along which the sound waves propagate at Mach 1. Slowing the sweep rate causes the radial location of this "Mach 1 arc" to move away from the laser source 310; increasing the sweep rate cause the Mach 1 arc to move towards the laser source 310.

Both the amplification and directionality of this process can be highly advantageous because they increase the local sound levels, localize the signal, and direct the signal toward a preferred receiver. Dynamic photoacoustics achieves an amplification proportional to L/D, where L is the length over which the laser beam is swept at Mach 1 and D is the beam diameter at the target (e.g., a disadvantaged user's head).

Figures 5A, 5B:
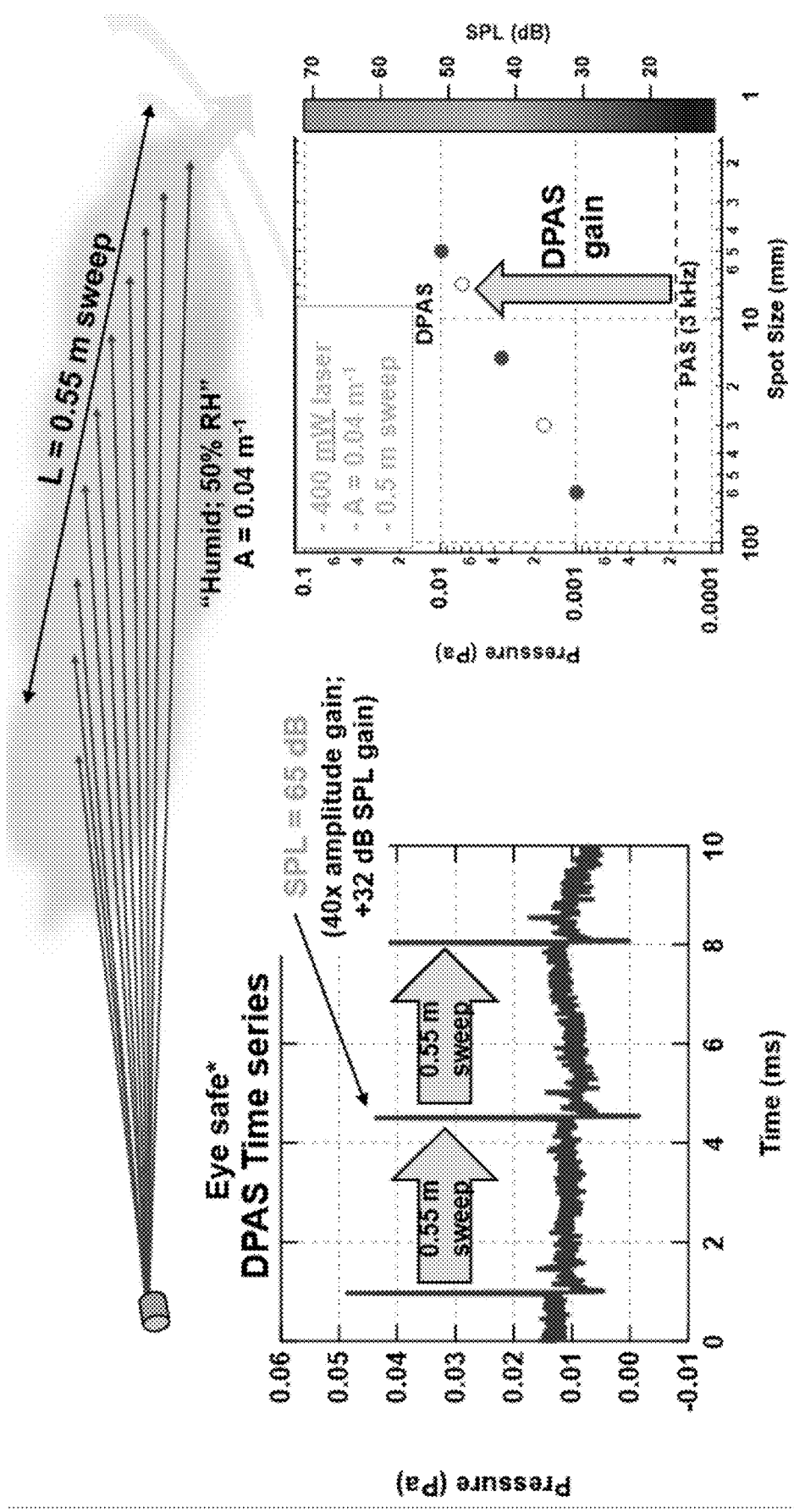
FIG. 5A is a plot of a pressure waveform generated by a dynamic photoacoustic system operating with a 1.9 μm thulium laser beam swept over an arc about 0.55 m long through 50% relative humidity (RH) ambient air.
FIG. 5B illustrates pressure versus laser spot size for the dynamic photoacoustic system operating with a 1.9 μm thulium laser beam swept 0.55 m through 50% relative humidity (RH) ambient air.

FIGS. 5A and 5B shows experimental measurements of a dynamic photoacoustic system (DPAS) like the one shown in FIGS. 3 and 4 operating in ambient air. A 1.9 μm thulium laser beam was swept repeatedly over an arc with a length of 0.55 m through 50% relative humidity (RH) air at a rate of about 3 kHz. The laser power was about 400 mW. FIG. 5A shows the resultant pressure waveform, with spikes indicating a 40-fold amplitude gain and a 32 dB sound pressure level (SPL) gain for a total gain of about 65 dB. And FIG. 5B shows the pressure versus laser spot radius, again with a total gain of about 65 dB at a radius of about 6 mm.

Multiple Modulated Laser Beams for Additional Gain and Improved Directionality

The use of multiple laser beams (added either coherently or incoherently) could provide additional gain and possibly improve directionality. Combining the resultant acoustic beams to produce the desired gain may exploit the Haas sound fusion effect, where identical sound sources presented in close (milliseconds) succession are perceived as fused by the recipient. Put differently, many eye-safe laser beams create sounds at slightly different locations and times. These sounds could either add coherently or incoherently depending on their positions in time and space with respect to the receiver.

Figure 6B:
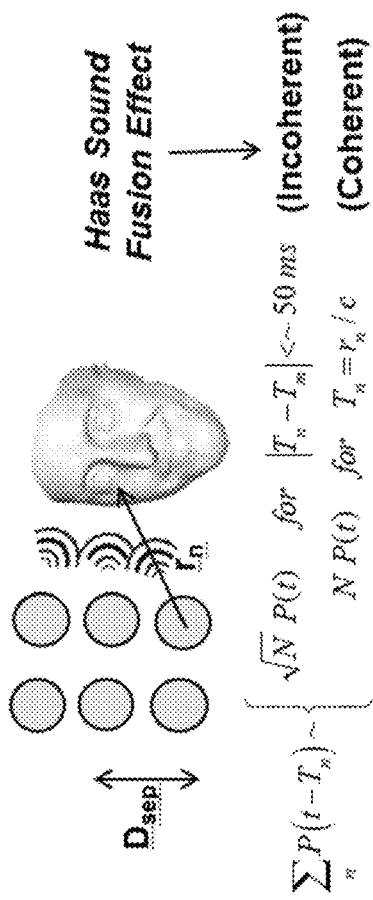
FIG. 6B shows a multi-beam combination to achieve gain beyond the traditional photoacoustic effect using the Haas sound fusion effect.
Figure 6A:
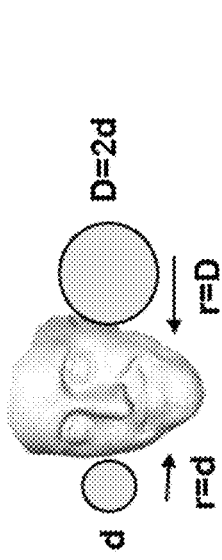
FIG. 6A illustrates the effects of beam diameter on photoacoustic sound pressure.

FIG. 6A illustrates the effect of beam size on photoacoustic signal strength. In FIG. 6A, the laser power is the same for each spot size, so the laser intensity is smaller for the bigger spot, hence the larger spot size does not increase the photoacoustic signal intensity. (In Equations 1 and 2 below, the laser intensity is taken to always be at the eye safe limit. Thus, when using Equations 1 and 2, we would increase the laser power when increasing the spot size and thus increase our photoacoustic signal intensity.)

FIG. 6B illustrates how to use the Haas sound fusion effect to achieve gain beyond the traditional photoacoustic effect. Instead of inducing photoacoustic modulation with just one modulated laser beam, many modulated laser beams induce photoacoustic modulation in closely located spots near the receiver (e.g., a person's ear or a microphone). The spots may form a one- or two-dimensional array with a pitch $D_{sep}$ and act as independent sound sources at radii $r_n$ from the receiver. The sources produce pressure waves that arrive at the receiver.

If the pressure waves arrive at the receiver substantially simultaneously (e.g., within $1/10^{th}$ of the wave's period), they will add coherently, producing an amplified pressure wave. For example, waves modulated at 1 kHz should arrive at the receiver within 0.1 ms of each other to add coherently at the receiver. If the pressure waves arrive at the receiver at staggered arrival times within a window of 50 ms or less, they will add incoherently. For the coherent and incoherent case, the gain scales with the number of spots N and the square root of the number of spots $\sqrt{N}$, respectively:

$$\sum_n P(t - T_n) \sim \begin{cases} \sqrt{N}\, P(t) \text{ for } |T_n - T_m| \leq 50 \text{ ms (Incoherent Case)} \\ NP(t) \text{ for } T_n = r_n/c \text{ (Coherent Case)} \end{cases}$$

Figure 6C:
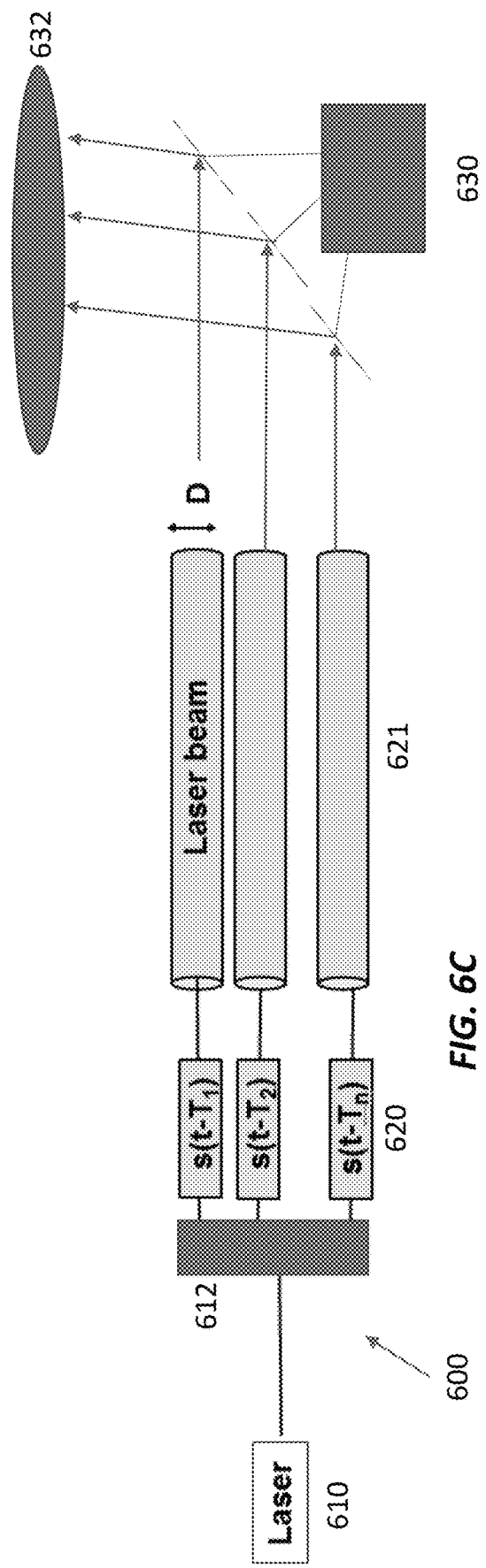
FIG. 6C shows a multi-beam photoacoustic transmitter.

FIG. 6C shows a multibeam photoacoustic system 600 for exploiting the Haas sound effect. The multibeam system 600 includes a laser source 610 that emits a laser beam, which is split N ways by 1×N beam splitter 610. The outputs of the beam splitter 610 are coupled to an array of independent modulators 620, which produce an array of modulated laser beams 621. These modulated laser beams 621 can be modulated with the same signal or with different signals, depending on the application. They can be directed to the same general area with an optional beam-steering mirror array 630 and lens 632 to exploit the Haas sound fusion effect as illustrated in FIG. 6B by creating many identically modulated pressure waves. Each laser beam 621 can have also its own unique amplitude (determined by laser power, sweep length, or both). They can also be directed to different spots with the different beam-steering elements in the mirror array 630. In addition, some or all of the beams 621 can be used to address the same receiver sequentially, potentially creating higher frequencies, higher repetition rates, and higher duty cycles than a single beam, which traverses a given distance at the speed of sound before repeating its sweep.

Link Considerations for Absorption of Modulated Light by Ambient Gas

A photoacoustic laser communications system operates by illuminating a gas in the neighborhood of a (human) receiver with a modulated laser beam. The gas absorbs at least some of the modulated laser beam, producing an audible acoustic wave. This gas can be any suitable gas that absorbs the laser light; ambient water vapor is a near ubiquitous choice. Even in a very dry environment, there exists enough water in the air to nonlinearly convert modulated laser light into a pressure wave. The upper bound on the amount of airborne water vapor is 100% relative humidity (RH), which at standard temperatures is $4 \times 10^4$ ppm water molecules in the air.

Figure 7:
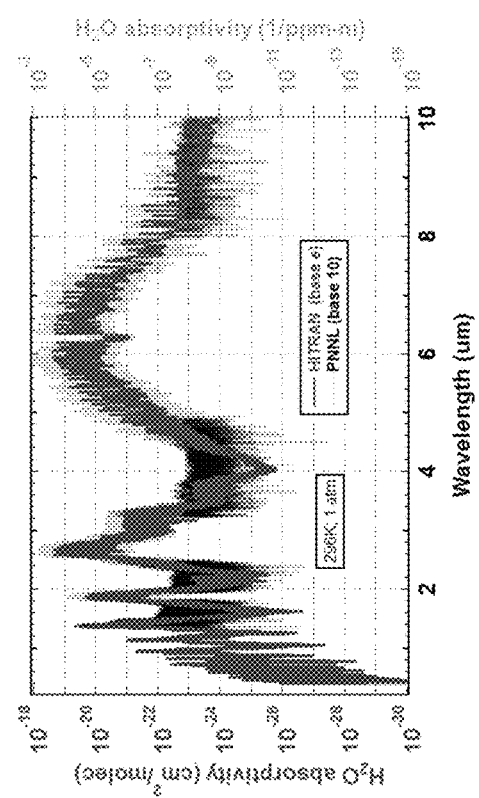
FIG. 7 shows optical absorption spectra of water vapor obtained from the high-resolution transmission molecular absorption (HITRAN) database and the Pacific Northwest National Laboratory (PNNL) database.

FIG. 7 shows optical absorption spectra of water vapor from two separate sources: the HITRAN database and the PNNL database. These spectra are plotted with different base units. Since acoustic pressure is directly proportional to optical absorption (see Eqn. (1) and (2) below), a laser wavelength for which water is strongly absorbing produces acoustic pressure more efficiently. Water has several particularly strongly absorbing features in the near infrared portion of the electromagnetic spectrum. Because near infrared light is strongly absorbed by water, it poses significantly less safety risk than light at wavelengths that can penetrate through the eye to the retina. The primary safety risk at these wavelengths is thermal damage; the associated eye and skin safety threshold is 100 mW/cm². Many commercial lasers exist in this regime, including those that emit light at wavelengths near 1.4 μm, 1.5 μm, and 1.9 μm. These are typically fiber-based lasers with very high available power levels. For these three reasons (strong water absorption, high safety margins, and commercially existing lasers), the near infrared region of the electromagnetic spectrum is a very attractive regime to operate an acoustic laser communications system.

Atmospheric optical absorption, A, affects the acoustic signal via two opposing roles. It attenuates the optical energy as it propagates to the receiver (lower absorption yields more optical energy near receiver) but is also directly proportional to the acoustic signal near the receiver (higher absorption yields more local acoustic energy). For a given range, a balance between these two constraints occurs when the absorption is the reciprocal of the range, $A=1/r$, where the range is the distance from the transmitting laser to the receiver (end user). We choose our operational range by choosing a particular absorption, A, which is in turn dictated by choice of laser wavelength via the water absorption spectrum above.

Figure 8:
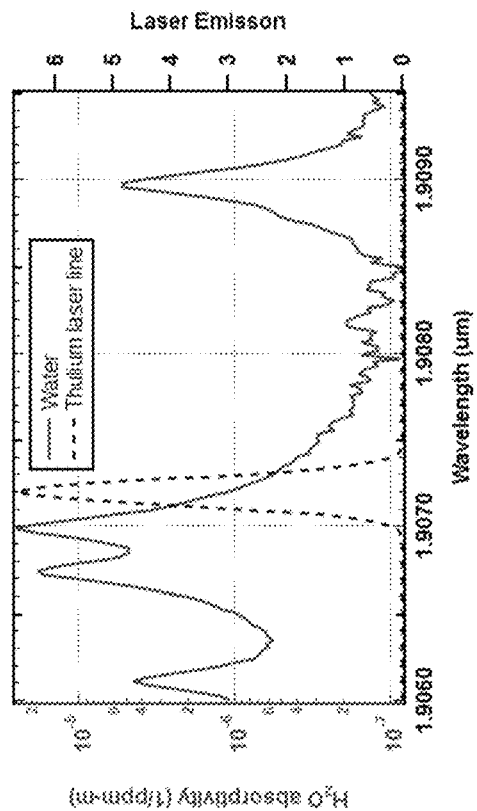
FIG. 8 is a plot of a thulium laser emission spectrum overlaid on a water vapor absorption spectrum.

FIG. 8 shows the output spectrum of a 1.9 μm thulium-based fiber laser from IPG Photonics overlaid on the water-vapor absorption spectrum. This laser is particularly attractive for acoustic laser communications. The gain bandwidth of thulium is sufficiently wide that alternate laser wavelengths can be obtained by inscribing different grating structures in the fiber. These different wavelengths (and their associated different absorption strengths) could be used for systems operating at different ranges. Under 50% RH conditions, the optical absorption, A, of this laser is 0.04 m$^{-1}$ with a corresponding system range of 25 m. We used this laser to demonstrate and assess the viability of an acoustic laser communications system, by creating audible acoustic signals in ambient air (at 50% RH) at eye-safe power levels of 100 mW/cm². The equations relating the relevant physical parameters are discussed below, as are test results for our system.

An acoustic laser communications system should efficiently convert optical energy into acoustic energy at safe laser levels. Equation (1) describes a relationship between photoacoustically created sound pressure and optical/physical parameters:

$$P(r) = \frac{\beta I_{safe} D^{1/2} A v^2}{2\sqrt{2}\, f_L C_P r^{1/2}} \quad (1)$$

where P is the pressure, β is the expansion coefficient of the gas (e.g., water vapor), $I_{safe}$ is the laser intensity (assumed to be bounded by the safe limit at the given wavelength), A is the optical absorption, v is the speed of sound, G is the specific heat of air, r is the range (the distance from the photoacoustic absorption), $f_L$ is the laser's amplitude modulation frequency, and D is the laser beam diameter. Equation (1) is valid in the large-beam limit in which the laser beam diameter, D, is larger than the characteristic acoustic size $vT_{Pulse}$, where $T_{Pulse}$ is the laser pulse duration (for a 50% duty cycle waveform, this will be half the period of the acoustic waveform). Since typical acoustic frequencies range between 20 Hz and 20,000 Hz, this period ranges between 50 ms and 50 μs for the modulated laser beam emitted by the laser source in a photoacoustic laser system.

When the laser beam diameter $D < vT_{Pulse}$ (the small-beam limit), Equation (2) describes the relevant physics:

$$P(r) = \frac{\beta I_{safe} D^2 A v^2}{8 f_L C_P r^{1/2} (v T_{pulse})^{3/2}}. \quad (2)$$

Together, Equations (1) and (2) provide the guidelines for creating a useful acoustic laser communications system.

Experimental Measurements of Photoacoustic and Dynamic Photoacoustic Communications We used a 1.9 μm thulium-based fiber laser (IPG Photonics) to assess the relevant acoustic transfer functions describing the conversion of optical energy into acoustic energy and verify their relevance to our photoacoustic communications. At 50% RH, the laser beam experiences absorption of $A=0.04$ m$^{-1}$. We used acousto-optic modulators (AOMs) to modulate the laser beam (square wave with 50% duty cycle) over a range of audible and ultrasonic frequencies. Since safe laser levels are typically defined by the laser energy per unit area, we systematically varied the beam diameter D (using a variety of lenses and maintaining optical power density at the target) to examine its effect on the system. An Earthworks M30 microphone (bandwidth=50 kHz) placed about 1 cm away from the edge of the laser beam detected the resulting acoustic signals.

FIGS. 9A-9C show the measured sound pressure levels produced by the photoacoustic system shown in FIG. 2. FIG. 9A shows measured and calculated transfer functions describing the conversion of eye safe optical energy at 50% RH into acoustic energy for various laser spot sizes. Markers represent measured data, solid lines represent the small-beam sound pressure levels given by Eq. (2), and dashed lines represent large-beam sound pressure levels given by Eq. (1). The right-hand axis gives the sound pressure level (SPL), where SPL=20 log [P(Pa)/28×10$^{-6}$]. The laser intensity was fixed at the eye-safe limit of 100 mW/cm$^2$. The laser spot size, D, was varied from 0.5 cm (squares, bottom trace) to 6 cm (triangles, top trace). FIG. 9B shows measured photoacoustic signals (in mPa) versus RH. The result shows that the signal strength is linear with RH. And FIG. 9C shows sent (T) and received (R) versions of a photoacoustic communications waveform, which was a 20 kHz to 1 kHz frequency sweep.

FIG. 9A shows several trends, including that each spot size has a corresponding cutoff frequency above which the pressure decreases from its maximum value. The maximum pressure occurs at the boundary between the small and large spot limits, i.e., when $D > v T_{Pulse}$. In the large-beam limit, contributions from different locations in the source do not coherently add due to the long acoustic transit time across the diameter. The pressure and corresponding sound pressure level (SPL) are in the audible regime (SPL>0 dB) for D>1 cm. Higher SPLs are achieved by using larger beam diameters, at the sacrifice of higher frequency content. The measurements of the photoacoustic signal strength versus relative humidity in FIG. 9B show a linear relationship. And the sent and received photoacoustic waveforms in FIG. 9C agree well, albeit with deviations at higher frequencies that may relate to several simplifications in Eq. (1).

FIGS. 10A-10C show similarly positive results for the dynamic photoacoustic systems shown in FIGS. 3 and 4. FIG. 10A shows an image plot of the dynamic photoacoustic time series data with respect to laser beam sweep velocity. Individual waveforms for Mach (M)=1.05, 1.00, and 0.95 are shown to the right of the image plot. For M>1, a time lag starts to grow between the leading compression and trailing rarefaction of the dynamic photoacoustic signal. This is caused by the swept laser beam traveling faster than the speed of sound, giving additional width (temporal length) to the signal.

FIGS. 10B and 10C show measurements of the photoacoustic signal strength and waveform compression timescale versus spot size, respectively. (The compression timescale in FIG. 10C is indicative of the forcing function on the water vapor molecules from the swept laser beam.) Both parameters vary linearly with spot size, with higher signal levels and shorter timescales for smaller laser spots. The signal level produced using the simple (static) photoacoustic configuration is overlaid on FIG. 10B. The results show that dynamic photoacoustics achieves an amplification proportional to L/D, where L is the length over which the laser beam is swept, and D is the spot size, as indicated above. The signal produced via this method was easily audible to the naked ear.

FIGS. 11A-11D show measurements of the spatial extent of the dynamic photoacoustic signal at a range of 2.5 m. These measurements were made by placing a microphone on a motorized translation stage arranged to measure the plane perpendicular to the sweep direction as shown in FIG. 11D. FIGS. 11A and 11B show results of these measurements for 50 cm and 25 cm propagation distances, respectively, where the propagation distance is the distance between the microphone and the starting location of the laser sweep as in FIG. 11D. A horizontal position of 0 mm corresponds to a laser sweep speed equal to Mach 1. Horizontal positions greater than 0 mm correspond to sweep speeds less than Mach 1, and horizontal positions less than 0 mm corresponds to sweep speeds greater than Mach 1.

The data in FIGS. 11A and 11B show a vertical separation (Δh) of acoustic energy for sweep speeds greater than Mach 1. The separation distance Δh increases linearly with Mach number as well as propagation distance. Simple computer simulations modeling the interference of spherically propagating wave fronts indicate that the Δh separation is linear with Mach number, consistent with our experimental results. FIG. 11C shows results of this simulation. The horizontal spatial extent of the photoacoustic signal becomes larger at longer standoff ranges because the relative Mach shifts occur at greater horizontal positions due to simple geometry. We confirmed this behavior at 10 m standoff range by measuring a photoacoustic signal proportionally larger along the horizontal axis.

There is a tradeoff between sweep length, which directly corresponds to gain, and the pulse repetition frequency (PRF) of the audible signal, where the PRF of a dynamic photoacoustic communications system is v/L. This means that a dynamic photoacoustic communications system designed with a swept path length of L=1 m can produce a single audible tone of frequency PRF=(343 m/s)/(1 m)=343 Hz. To increase the audible frequency, either the sweep length could be reduced (at the cost of gain) or more laser beams could be added. The laser spot size places an upper limit on the PRF, as the spot size dictates the lower bound on the waveform timescale. For sample operational parameters, e.g., D=3 cm, PRF=1 kHz, ANSI constraints for eye-safe and skin-safe operation on average power (100 mW/cm$^2$) are more stressing than peak fluence (100 mJ/cm$^2$). Since average power is proportional to PRF, this implies that low frequencies can be generated more loudly and safely than higher frequencies (everything else being equal).

FIG. 12 shows specifications and performance of short- and long-range photoacoustic communications systems. The short-range system has a range of about 25 m (assuming an absorption of 0.04 m$^{-1}$), a spot diameter of 0.36 m, and a laser power of 102 W. It has a peak pressure of about 300 mPa and a peak gain of about 60 dB at a modulation frequency of about 1 kHz. The long-range system has a range of about 500 m (assuming an absorption of 0.002 m$^{-1}$), a spot size of 3 m, and a laser power of 7 kW. It can be mounted in or on a van, truck, helicopter, building or other platform and has a peak pressure of about 400 mPa and a peak gain of about 62 dB at a modulation frequency of about 100 Hz.

Photoacoustic Coupling the Receiver's Ear or a Nearby Object

Photoacoustic communications can also be carried out by (1) absorption of light by the receiver's skin and subsequent transmission to the inner ear or (2) photoacoustic coupling to a nearby object of opportunity (e.g., a window or nearby vessels of fluid) followed by airborne acoustic transmission across a relatively short distance to the receiver. Each of these coupling modalities involves (a) creating an acoustic signal near the ear (either in a nearby object or in the tissue near the eardrum), and then (b) propagating that energy to the eardrum. A reasonable approximation of (a) is to treat the tissue as water illuminated by light.

Biomedical photoacoustics have shown that non-audible frequencies can be induced in tissue. Photoacoustic communications instead either creates audible frequencies directly via a laser modulated at those frequencies or creates higher frequencies that are subsequently mixed down to the audible band, e.g., by amplitude modulating a high-frequency signal and/or mixing waves at different frequencies to produce a beat note. Photoacoustic signals can also use transmission pathways like those in "bone conduction," with a mechanical oscillator stimulating the ear cartilage from which sound is ultimately conducted to the inner ear and detected as an audible signal.

Photoacoustics for Secure Communications and Location Proving

A photoacoustic communications system can create a spatially localized audio signal from a large remove, forcing an eavesdropper attempting to overhear this audio signal to come into close physical proximity to the intended receiver. In contrast to laser communications, which are localized in angle only but not range, photoacoustic communications are localized in three spatial dimensions. Furthermore, typical laser communications require precise line-of-sight alignment in order to close the communications channel. Photoacoustic communications do not suffer from such tight alignment restrictions because the sound waves propagate away from the volume illuminated by the modulated laser beam.

The structure of the photoacoustic communications channel enables a form of secure communications based on the concept of perfect secrecy, or physical layer security, where secrecy is guaranteed without relying on computational assumptions. Assuming an eavesdropper with a disadvantaged channel relative to the intended receiver, the transmitter and intended receiver can communicate reliably without revealing information to the eavesdropper.

The communication rate supported by this secure channel is limited by the difference in the quality of the receiver and eavesdropper's channel. The Shannon channel capacity bounds the number of bits that can be reliably sent across a noisy channel. For example, for an additive white Gaussian noise channel with bandwidth W, the channel capacity is W log 2(1+SNR) bits per second (b/s), where SNR is the channel signal-to-noise ratio. TALC enables the establishment of a channel between the sender and receiver where the eavesdropper has a significant disadvantage (i.e., a noisier channel due to the rapid decay of audio signals) that we can exploit to achieve secret communication. For example, with a 10 m separation, an SNR of 10 at the intended receiver, and 1 kHz of audio bandwidth, one can achieve a rate of approximately 2 kbits/s of secret communication assuming identical gains at the receiver and eavesdropper.

To better understand this channel quality difference, consider a case where the sender is sending a message to an intended receiver. Assume that this primary channel has capacity $C_1$=4 b/s (e.g., 16-Quadrature Amplitude Modulation (QAM)). If an eavesdropper has a noisier channel relative to the sender than the intended receiver, then the eavesdropper's channel has a lower capacity, $C_2$=2 b/s (e.g., 4-QAM) in our example. The difference in these two channel capacities $C_1-C_2$=2 bits (per channel use) bounds the rate at which the sender can reliably communicate while achieving information theoretic secrecy in the presence of an eavesdropper.

Traditionally, physical layer security has been explored in the context of wireless communications systems, as an alternative to cryptographic schemes that rely on assumptions about computational hardness. Photoacoustic communications enable non-traditional secure communications channels by enabling a transmitter/receiver pair to communicate via localized acoustic waves that decay rapidly at high frequencies, effectively precluding eavesdropping at large distances.

Using verifiable location to determine functionality and grant or deny privileges is useful for numerous applications. A secure location proving protocol can be built using the secret communications scheme discussed above as a core building block. Photoacoustic communications could be used to periodically provide a unique physical code to each physical location of interest, for example, by scanning a modulated laser beam over a large area. An entity claiming to be at a physical location would be challenged to provide the unique code associated with that location and a limited time in which to provide that answer (set, for example, by the propagation speed of the sound waves).

FIG. 14 shows how photoacoustic secure location proving can be used to verify the location of a drone 132 with respect to an airport control tower 130. A controller in the airport control tower 130 sends a warning message 131 to the drone 132 via an optical or radio-frequency communications link. An antenna on or near the airport control tower 130 may broadcast this warning message 1301, which informs the drone 1302 that it must remain a minimum range away from the airport. The warning message 1301 also includes a query about a code or key 1331 transmitted by a photoacoustic communications system 1300 to a location at the minimum range via a modulated laser beam 1321. This code 1331 may include a unique sequence of numbers, letters, tones, or other sounds. If the drone 132 is at this location, it can detect the code 1331 with an on-board microphone; otherwise, it cannot detect the code 1331. If the drone 132 detects the code 1331 successfully, it repeats the detected code to the tower 130 in a message 133 via the optical or radio-frequency communications channel. Failure to repeat the code 1331 successfully within a predetermined time could trigger an alarm or change in flight patterns at the airport.

The localized nature of the audio signal and its slow propagation mitigates some of the relay and eavesdropping challenges faced by location-proving protocols that rely on more traditional signaling channels. An entity that is truly at a location and provides the correct code as proof could claim privileges associated with that location, trigger desired actions, or prevent undesired actions.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of communications, the method comprising:
emitting an intensity-modulated laser beam from a laser source;
illuminating water vapor with the intensity-modulated laser beam, the intensity-modulated laser beam creating a pressure wave in the water vapor via the photoacoustic effect, the pressure wave creating an audible sound;
detecting the audible sound with a receiver;
decoding a message conveyed by the audible sound with a processor operably coupled to the receiver; and
transmitting a response to the message from a transmitter operably coupled to the processor.

2. The method of claim 1, wherein emitting the intensity-modulated laser beam from the laser source comprises generating a laser beam at a wavelength of 1.9 µm.

3. The method of claim 2, wherein emitting the intensity-modulated laser beam from the laser source comprises modulating an intensity of the laser beam at a frequency of about 20 Hz to about 20 kHz.

4. The method of claim 1, wherein illuminating the water vapor with the intensity-modulated laser beam creates the audible sound at a person's ear.

5. The method of claim 1, further comprising:
sweeping the intensity-modulated laser beam across an arc, the intensity-modulated laser beam traveling at a linear speed of Mach 1 at a range R from the laser source.

6. The method of claim 5, further comprising:
changing a rotational velocity of the intensity-modulated laser beam across the arc so as to change the range R at which the intensity-modulated laser beam travels at the linear speed of Mach 1.

7. The method of claim 1, further comprising:
verifying a location of the receiver based on the response to the message.

8. A method of communications, the method comprising:
emitting an intensity-modulated laser beam from a laser source;
illuminating water vapor with the intensity-modulated laser beam, the intensity-modulated laser beam creating a pressure wave in the water vapor via the photoacoustic effect, the pressure wave creating an audible sound, wherein the intensity-modulated laser beam is a first intensity-modulated laser beam and the pressure wave is a first pressure wave, and further comprising:
illuminating the water vapor with a second intensity-modulated laser beam while illuminating the water vapor with the first intensity-modulated laser beam, the second intensity-modulated laser beam creating a second pressure wave in the water vapor via the photoacoustic effect, the second pressure wave adding with the first pressure wave to create the audible sound.

9. The method of claim 8, wherein the second pressure wave adds coherently with the first pressure wave.

10. A communications system comprising:
a laser source to illuminate water vapor with an intensity-modulated laser beam, the intensity-modulated laser beam creating a pressure wave in the water vapor via the photoacoustic effect, the pressure wave creating an audible sound; and
a beam-steering element, in optical communication with the laser source, to sweep the intensity-modulated laser beam across an arc through the water vapor, the intensity-modulated laser beam traveling at a linear speed of Mach 1 at a range R from the laser source.

11. The communications system of claim 10, wherein the laser source is configured to emit the intensity-modulated laser beam at a wavelength of 1.9 μm.

12. The communications system of claim 11, wherein the laser source is configured to modulate the intensity-modulated laser beam at a frequency of about 20 Hz to about 20 kHz.

13. The communications system of 10, wherein the beam-steering element is further configured to change a rotational velocity of the intensity-modulated laser beam across the arc so as to change the range R at which the intensity-modulated laser beam travels at the linear speed of Mach 1.

14. A method of communications, the method comprising:
emitting an intensity-modulated laser beam from a laser source; and
sweeping the intensity-modulated laser beam across an arc, the intensity-modulated laser beam traveling at a linear speed of Mach 1 at the range R from the laser source, the intensity-modulated laser beam creating a pressure wave at the range R via the photoacoustic effect.

15. The method of claim 14, wherein an amplitude of the pressure wave is higher at the range R than at other ranges.

16. A method of proving a location of a receiver, the method comprising:
illuminating, by a transmitter, water vapor near a receiver with a laser beam modulated with a message, the intensity-modulated laser beam creating a pressure wave modulated with the message in the water vapor via the photoacoustic effect;
detecting, by the receiver, the pressure wave modulated with the message;
decoding, by the receiver, the message modulated on the pressure wave; and
transmitting, by the receiver to the transmitter, a response to the message.

17. The method of claim 16, wherein the message comprises instructions for establishing a secure communications channel between the transmitter and the receiver.

18. The method of claim 16, further comprising:
verifying, by the transmitter, a location of the receiver based on the response to the message.

* * * * *